United States Patent
Hahn-Carlson (10) Patent No.: US 7,725,372 B2
(45) Date of Patent: May 25, 2010

(54) TRANSACTION PAYABLES PROCESSING SYSTEM AND APPROACH

(75) Inventor: Dean W. Hahn-Carlson, Lilydale, MN (US)

(73) Assignee: Syncada LLC, Minneapolis, MN (US)

( * ) Notice: Subject to any disclaimer, the term of this patent is extended or adjusted under 35 U.S.C. 154(b) by 0 days.

(21) Appl. No.: 11/867,479

(22) Filed: Oct. 4, 2007

(65) Prior Publication Data

US 2008/0086397 A1 Apr. 10, 2008

Related U.S. Application Data

(60) Provisional application No. 60/850,046, filed on Oct. 6, 2006.

(51) Int. Cl.
- G07F 19/00 (2006.01)
- G06Q 30/00 (2006.01)
- G06Q 40/00 (2006.01)
- G07B 17/00 (2006.01)

(52) U.S. Cl. .............................. 705/34; 705/26; 705/30; 705/37

(58) Field of Classification Search .................. 705/26, 705/34, 37

See application file for complete search history.

(56) References Cited

U.S. PATENT DOCUMENTS

| | | | | |
|---|---|---|---|---|
| 4,992,940 | A | * | 2/1991 | Dworkin ....................... 705/26 |
| 5,671,362 | A | * | 9/1997 | Cowe et al. ................... 705/28 |
| 5,712,990 | A | * | 1/1998 | Henderson ................... 705/28 |
| 5,732,400 | A | * | 3/1998 | Mandler et al. ............... 705/26 |
| 5,910,896 | A | | 6/1999 | Hahn-Carlson |
| 5,991,728 | A | * | 11/1999 | DeBusk et al. ................. 705/2 |
| 6,012,041 | A | * | 1/2000 | Brewer et al. ................. 705/28 |
| 6,044,362 | A | * | 3/2000 | Neely ........................... 705/34 |
| 6,115,649 | A | * | 9/2000 | Sakata ......................... 700/241 |
| 6,204,763 | B1 | * | 3/2001 | Sone ......................... 340/568.1 |
| 6,246,994 | B1 | * | 6/2001 | Wolven et al. ........... 705/14.39 |
| 6,260,024 | B1 | * | 7/2001 | Shkedy ........................ 705/37 |
| 6,366,829 | B1 | * | 4/2002 | Wallace ...................... 700/236 |
| 6,418,441 | B1 | * | 7/2002 | Call ............................. 707/10 |

(Continued)

FOREIGN PATENT DOCUMENTS

WO WO01/09782 8/2001

OTHER PUBLICATIONS

Berhad, "Fueling financial oil for the economy", The New Straits Times Press (Malaysia), 2001.*

(Continued)

*Primary Examiner*—Matthew S Gart
*Assistant Examiner*—Talia Crawley
(74) *Attorney, Agent, or Firm*—Crawford Maunu PLLC (57) ABSTRACT

Transaction management for financial institution-based transactions is facilitated. According to an example embodiment of the present invention, a transaction management approach involves the processing of financial aspects of transactions for a plurality of buyers using transaction rules associated with each buyer for automatically auditing each transaction (for each buyer) and any associated invoices. When a transaction or series of transactions are approved for payment for a particular buyer, the payment is automatically facilitated on behalf of the particular buyer. A fee is then assessed for each transaction or series of transactions, to one or more of the particular buyer, involved seller (or sellers), and a sponsor of the buyer that sponsors the buyer's participation.

28 Claims, 3 Drawing Sheets

U.S. PATENT DOCUMENTS

| | | | |
|---|---|---|---|
| 6,490,567 B1* | 12/2002 | Gregory | 705/39 |
| 6,571,149 B1* | 5/2003 | Hahn-Carlson | 700/216 |
| 6,673,479 B2* | 1/2004 | McArthur et al. | 429/12 |
| 6,697,702 B1* | 2/2004 | Hahn-Carlson | 700/213 |
| 6,741,968 B2* | 5/2004 | Jacoves et al. | 705/14.23 |
| 6,785,661 B1* | 8/2004 | Dixon et al. | 705/39 |
| 6,850,900 B1* | 2/2005 | Hare et al. | 705/26 |
| 7,475,024 B1* | 1/2009 | Phan | 705/26 |
| 7,548,884 B1* | 6/2009 | Thomas | 705/38 |
| 2002/0107794 A1* | 8/2002 | Furphy et al. | 705/40 |
| 2002/0116334 A1* | 8/2002 | Bennett et al. | 705/40 |
| 2002/0198829 A1* | 12/2002 | Ludwig et al. | 705/40 |
| 2003/0033205 A1* | 2/2003 | Nowers et al. | 705/26 |
| 2003/0233286 A1* | 12/2003 | Hahn-Carlson et al. | 705/26 |
| 2004/0010463 A1* | 1/2004 | Hahn-Carlson et al. | 705/39 |
| 2004/0019562 A1* | 1/2004 | Viberg | 705/40 |
| 2004/0139032 A1* | 7/2004 | Rowan | 705/80 |
| 2004/0158510 A1* | 8/2004 | Fisher | 705/30 |
| 2005/0015332 A1 | 1/2005 | Chen | |
| 2005/0149378 A1* | 7/2005 | Cyr et al. | 705/10 |
| 2005/0278220 A1 | 12/2005 | Hahn-Carlson et al. | |
| 2005/0289023 A1* | 12/2005 | Hahn-Carlson et al. | 705/30 |
| 2006/0015454 A1 | 1/2006 | Hahn-Carlson | |
| 2006/0167792 A1* | 7/2006 | Hahn-Carlson | 705/40 |

OTHER PUBLICATIONS

Singh, "A new road to recovery", Risk, Sep. 2004. pp. 108-110.*

* cited by examiner

TRANSACTION PAYABLES PROCESSING SYSTEM AND APPROACH

RELATED PATENT DOCUMENTS

This patent document claims the benefit, under 35 U.S.C. §119(e), of U.S. Provisional Patent Application No. 60/850,046 filed on Oct. 6, 2006 and entitled: "Transaction Finance Processing System and Approach," which is fully incorporated herein by reference.

FIELD OF THE INVENTION

The present invention is directed to transaction processing and, more specifically, to a transaction processing system adapted for automatically processing financing aspects of a multitude of transactions on behalf of a plurality of transaction parties.

BACKGROUND

Operational management of contractual and transactional interactions between buyers, sellers, financial institutions and others involved in the exchange of products for purposes of commerce have typically been labor and time intensive. Generally, the processes of managing transactions between business entities have been unduly burdensome and inefficient.

For many organizations, managing and tracking transaction financing functions such as those related to accounts payables and/or accounts receivables can be particularly burdensome and costly. When a particular organization contracts and otherwise does business with a large number of suppliers/sellers, the organization typically must interact with each supplier/seller on an individual basis. As the diversity of these interactions increases, the burden and cost associated with managing and tracking finance-based business functions is exacerbated.

Individual interactions between buyers and sellers are often characterized by specific contracts, payment rules and other financial processing characteristics. For example, certain sellers may require payment terms such as a net payment due within a particular time period, payment to a particular financial institution or payment in a particular currency. In addition, certain sellers may require different payment terms for different contracts. Entity-specific and transaction-specific variances in payment terms can be particularly difficult to manage and track. Buyers, on the other hand, may prefer payment terms that may be inconsistent with those required (or desired) by sellers.

In addition, when a transaction reaches the payment step, financial institutions for different parties to the transaction must interact with each other. This interaction typically involves complex agreements and associations that facilitate the transfer of funds. At times, there can be delays in payment or disputes regarding terms of payment. In addition, this process is highly susceptible to error. Interaction complexity, delay and error, as well as a multitude of other characteristics of transaction payment can cost one or more parties to a transaction (including financial institutions) a significant amount of funds.

Most industries are quite competitive and any cost savings are therefore important. Administrative costs are targeted for reduction as no revenue is directly generated from administrative functions. However, administrative costs associated with commercial transactions have been difficult to reduce in the current business environment with widely diffused data.

The above and other difficulties in the management and coordination of business transactions have presented administrative and cost challenges to business entities involved in various aspects of transactions, including accounts payable aspects and others.

SUMMARY

The present invention is directed to overcoming the above-mentioned challenges and others related to the types of devices and applications discussed above and in other applications. The present invention is exemplified in a number of implementations and applications, some of which are summarized below.

According to an example embodiment of the present invention, transactions involving buyer and seller transaction parties are managed using an approach generally involving the use of rules for processing finance-related aspects of the transactions. In some applications, the rules are implemented for accounts payables; in other applications, for accounts receivables; and in still other applications, for accounts payables and receivables. Seller transaction parties enter into the management approach as facilitated by the buyer transaction party, with payment-related aspects of transactions between the seller transaction parties and the buyer being facilitated directly with the seller transaction parties. Fees associated with the processing of payment to sellers are assessed to each seller and/or to a respective buyer for each transaction in which the sellers and the buyer participate.

In a more particular example embodiment of the present invention, an automated transaction processing system is adapted for processing business transactions involving a buyer party and a seller party. Buyer parties provide information including contracts and business rules including auditing rules for transactions involving the buyer party and selected seller parties. A transaction processor audits transactions on behalf of each buyer party using that party's provided information, and facilitates payment to one or more selected seller parties involved in the particular transaction being audited (e.g., when the audit indicates payment is appropriate).

According to another example embodiment of the present invention, an automated transaction processing system electronically processes transactions involving buyers. The system uses, for each transaction, electronic profile data that is appropriate to each buyer/seller pairing and a contract data set defined as a function of the buyer and a predefined business relationship between the buyer and at least one seller. The system includes a transaction processor arrangement to process electronic transactions according to the stored contract data sets and profile data. The arrangement includes a computer-implemented auditing engine that audits transaction data using a stored contract data set for the transaction, and generates computer-readable audit data characterizing the audit. A computer-implemented payment processor finances and processes electronic payment to a seller financial institution in response to generated audit data indicating that payment to the seller is appropriate for at least one transaction involving the seller and a buyer. A computer-implemented fee assessment engine assesses a transaction processing fee, for each seller to which electronic payment is made, by generating computer-readable fee data that associates the fee and a fee amount with a seller for which the fee data is generated.

In connection with another example embodiment of the present invention, a transaction-based computer processing arrangement processes payable funds for transactions between buyers and sellers, wherein at least one of a buyer and seller in each transaction transacts with a system administrator to process a payment account for the at least one of a buyer and seller. The computer processing arrangement is independent from the buyers and sellers. For each of a plurality of seller invoice data sets, the arrangement associates the seller invoice data set with a transaction involving a buyer and seller using predefined contract data for a contract between the buyer and the seller, audits the associated invoice data set using the predefined contract data and audit data specified by the buyer in the transaction, and generates computer-readable audit data characterizing the audit. For each buyer, the arrangement processes electronic payment to sellers' financial institutions in response to generated audit data indicating that payment to a seller is appropriate for at least one invoice data set for the seller. The arrangement also assesses a transaction processing fee for each processed electronic payment by generating computer-readable fee data that associates the assessed fee and fee amount with a seller for which the electronic payment is generated.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of transaction processing and management approaches, and has been found to be particularly useful for applications involving the processing of payment, such as for accounts payables or accounts receivables, on behalf of a party to a transaction. While the present invention is not necessarily limited to such approaches, various aspects of the invention may be appreciated through a discussion of various examples using these and other contexts.

According to an example embodiment of the present invention, a transaction processing system includes a payment processor that interacts with financial institutions and one or more transaction parties for processing payment functions on behalf of one or more transaction parties (e.g., who facilitates involvement with the transaction processing system). The transaction processing is partly or wholly remote from the buyers, sellers and financial institutions (and/or processing systems implemented therefore). The payment processor interacts with transaction parties such as buyers or sellers to acquire and store profile information for the parties, and to receive and process data for transactions involving these parties. The payment processor uses the profile information to processes transaction data and, therein, determine finance-related payment conditions for the transaction, such as for extending credit to a buyer (e.g., paying a seller on behalf of the buyer), or to a seller (e.g., for paying the seller early, and collecting payment from the buyer at a later time). When a finance-related payment condition for a particular transaction is determined to be satisfied and, where appropriate, when other profile-specified payment conditions have also been met, the payment processor interacts with a sponsoring financial institution or that sponsoring financial institution's profile within the payment processor to facilitate the payment. Payments are tracked and fees are assessed in accordance with the payments that are made.

In some instances, a financial institution underwrites the payment to provide assurance to the seller that an owing buyer will make a timely payment. In other instances, the underwriting is effected for an actual extension of credit funds on behalf of the underwritten buyer, or to an underwritten seller, for payment to a seller. That is, for underwriting purposes, the credit of one or both of the buyer or seller is selectively used in accordance with profile information and/or other processing characteristics. Fees are also assessed, where appropriate, to transaction parties for the underwriting. Such approaches are applicable for payment approval (with underwriting) in connection with various embodiments described herein, and including those shown in the Figures.

In some applications, the transaction processing system facilitates both accounts payable and accounts receivable processing on behalf of a buyer and a seller respectively for a particular transaction. For instance, the buyer and seller may each specify in their respective profile information that payment be made at a specified time period under certain conditions. Using this approach, consider a particular transaction example wherein the seller requests payment at 30 days, the buyer requests a delay in payment to 90 days, and wherein a contract for the transaction specifies payment to be made within 60 days. In such an example, the transaction processing system advances payment to the seller at 30 days, assessing a fee against the seller for such an early payment, and delays collection from the buyer until 90 days, similarly assessing a fee against the buyer. The respective payments are made in accordance with profiles for the parties being paid, with audits or other processing functions carried out as appropriate.

According to another example embodiment of the present invention, a transaction processing system includes an accounts receivable processor that interacts with financial institutions or a processing profile that each institution maintains with the accounts receivable processor and one or more transaction parties for processing accounts receivable functions on behalf of a seller (e.g., who facilitates involvement with the transaction processing system). The accounts receivable processor interacts with the seller for processing transactions involving the seller, using stored profile information for the seller. The accounts receivable processor uses transaction information and the seller profile information to determine when a payment to the seller is to be made, and further interacts with a sponsoring financial institution for the seller or that institution's registered profile to facilitate payment to the seller and, where appropriate, indicating what the payment is for. The payment is determined to be proper in accordance with the seller's business rules and/or rules associated with the accounts receivable processor, such as by paying the seller upon the recordation of an invoice, upon delivery, upon acceptance of delivery by a buyer, or upon another transaction-related condition. Fees are assessed to the one or more sellers for the tendering of payment thereto. These fees may include, for example, convenience fees for processing transactions, fees for the extension of credit for a particular payment, currency conversion fees and others. Such fees may further be set in or otherwise specified via contract data for a contract between a seller and an operator of the transaction processing system, or in profile data for such a seller, with an amount of the fee determined in accordance therewith (e.g., as a percentage of a payment). The accounts receivable processor further facilitates collection, either directly from a buyer, from the seller (after the buyer pays the seller or after a predetermined number of days), or from the buyer directly to the sponsoring financial institution. Where appropriate, collection from the buyer is underwritten, either using the buyer's credit or the seller's credit, the latter of which is particularly applicable where ultimate collection is from the seller.

According to another example embodiment of the present invention, a transaction processing system includes an accounts payable processor that interacts with financial institutions, or the processing profile that each such institution maintains with the accounts payable processor, and one or more transaction parties for processing accounts payable functions on behalf of a buyer (e.g., who facilitates involvement with the transaction processing system). The accounts payable processor interacts with the buyer for auditing transactions involving the buyer, using stored profile information for the buyer. When a transaction is successfully audited (e.g., approved for payment), the accounts payable processor interacts with a sponsoring financial institution for the buyer or that institution's registered profile for tendering payment to one or more sellers on behalf of the buyer and, where appropriate, indicating what the payment is for. Fees are assessed to the one or more sellers for the tendering of payment thereto, with the payment being made on behalf of the buyer being underwritten by the financial institution. In some instances, the underwriting is effected to provide an assurance that the buyer will make a timely payment. In other instances, the underwriting is effected for an actual extension of credit funds on behalf of the underwritten buyer, for payment to a seller. Fees are also assessed, where appropriate, to the one or more sellers for the underwriting of the payment by the sponsoring financial institution.

In the following discussion, various examples are described in connection with scenarios involving an accounts payables approach (e.g., a buyer-side approach) to processing transaction payment. However, for various example embodiments, one or more of the following approaches are implemented with an accounts-receivables approach (e.g., a seller-side approach), with payment to a seller advanced in accordance with the seller's wishes as specified, for example, in seller profile information.

In one implementation, an accounts payable processor as described above is adapted to respond to an authorization received from a buyer by authorizing payment for a transaction to which the authorization applies. When sellers (e.g., as defined in profile information for a particular buyer) send an invoice to the accounts payable processor, the buyer associated with the invoice is contacted and allowed to review the invoice. This review may be carried out, for example, using an electronic communications link facilitating the buyer's access to information on the invoice. The buyer can then electronically review and, if appropriate, authorize payment for some or all of any amount indicated on the invoice. The accounts payable processor responds to payment authorization from the buyer by automatically facilitating payment for the invoice in accordance with stored profile information for the seller providing the invoice.

Transaction and/or credit fees are assessed, where appropriate, to sellers as set forth in one or more agreements between the buyer, the seller and an operator of the accounts payable processor. For example, when credit is extended for payment on behalf of a buyer, a financial institution underwriting the buyer's payment (e.g., sponsoring the buyer's payment) underwrites the extension of credit. A fee is assessed for the underwriting, e.g., as part of an overall transaction participation fee against the seller. In this regard, a seller's participation in the automatic processing of the transaction is associated with a fee that is used to cover transaction processing and underwriting functions, with the processing generally affording each seller a corresponding cost savings in otherwise facilitating the transaction.

In some applications, the accounts payable processor stores contract information and audits transactions using the contract information. For example, when a buyer determines that a particular contract has payable aspects, the buyer can send a payment authorization to the accounts payable processor. The buyer may send a notice indicating that a payable condition, such as a determination that goods are acceptable, has been met. This payable condition may apply, for example, to an entire invoice or perhaps to a portion of an invoice that relates to the particular goods determined to be acceptable (e.g., where a partial shipment is deemed acceptable). The accounts payable processor matches the notice to a particular contract involving the buyer and uses the received payable condition together with other information to determine whether a payment can and/or should be made. If payment can be made, the accounts payable processor automatically processes payment on behalf of the buyer using the contract terms with the notice of receipt of goods. As discussed above, this and other approaches are applicable for implementation with an accounts receivable processor wherein, for example, the receivable processor similarly authorizes payment or otherwise determines than payment can be made to a seller.

In another example embodiment of the present invention, a user interface is adapted for use in invoice presentment for approval by buyers. A transaction processor, such as the accounts payable processor discussed above, generates a graphical user interface (GUI) that can be viewed by remote buyer parties. Data access via the GUI is driven by user profile information accessible by the transaction processor, with access control inputs such as password and identification data received via the GUI being compared against the profile information for controlling access.

When an invoice is received from a seller, that invoice is matched to a particular buyer and, in some instances, to a particular contract between the buyer and the seller. The transaction processor makes the invoice available to the particular buyer for viewing via the GUI, together with other invoices from other sellers, where applicable. At periodic instances or at any time deemed appropriate by the buyer, the GUI is accessed (e.g., by an employee user of the seller) and pending invoices are reviewed for approval. If conditions regarding the transaction are conducive to approval of the invoice, such as when goods that are the subject of the invoice have been delivered in acceptable condition, the employee user can approve the invoice for payment via the GUI.

In some applications, the GUI is further configured for providing data to the buyers regarding a variety of transaction characteristics, such as data identifying open and paid invoices, financial data such as information relating to a credit line and pending payments, and other accounting-type data typically associated with accounts payables. The buyer can use the GUI to retrieve this information and, in some applications, to generate and monitor accounting-type data for a variety of purposes.

Figure 1:
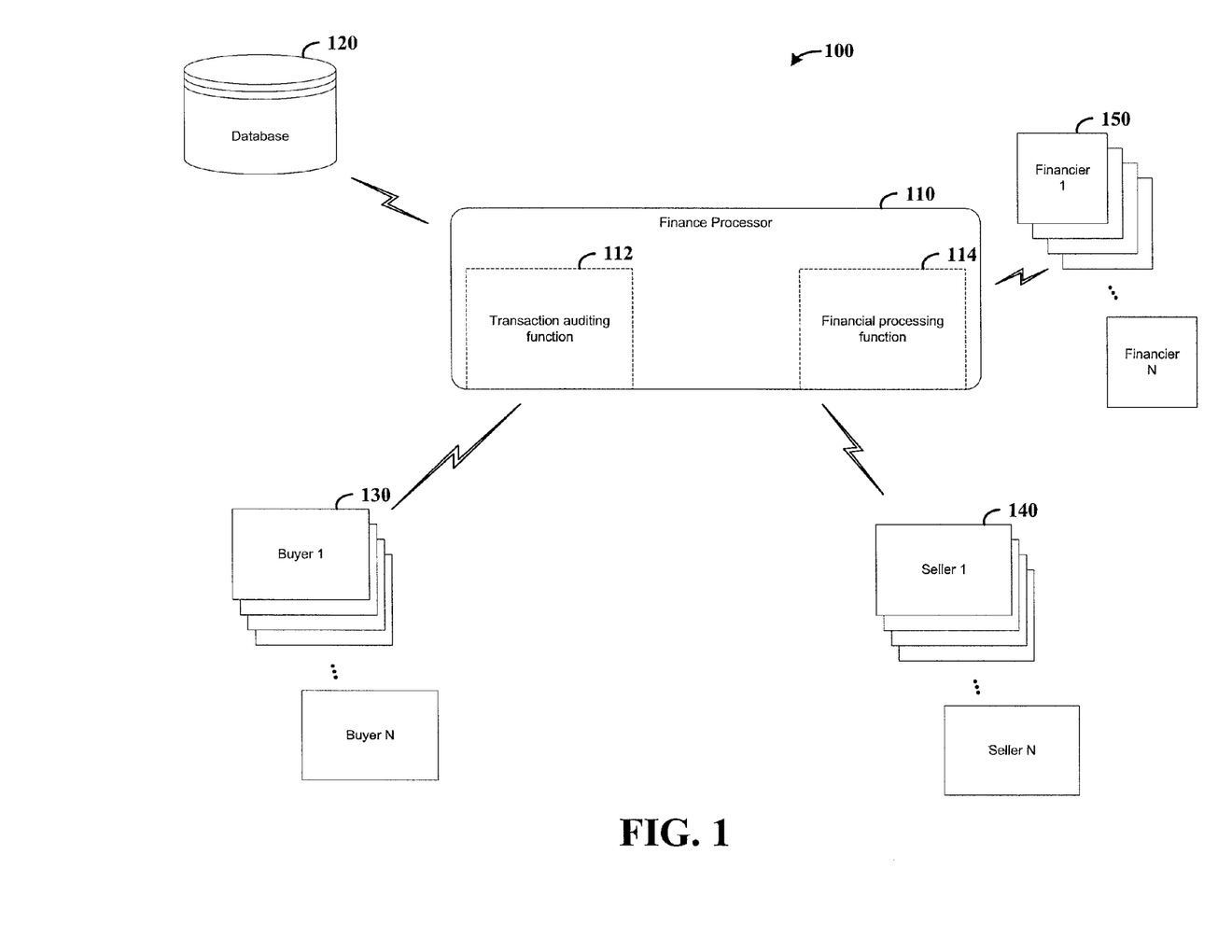
FIG. 1 shows an arrangement and approach for transaction management, according to an example embodiment of the present invention.

FIG. 1 shows an arrangement and approach 100 for transaction management, according to another example embodiment of the present invention. A transaction finance processor 110 is implemented with transaction auditing and financial processing functions. The transaction finance processor 110 is communicatively coupled to a database 120 that stores user profiles for transaction parties as well as contract information for transactions involving the transaction parties. In some instances, the transaction finance processor includes the database 120 and in other instances, the database 120 is remotely situated from the transaction finance processor and/or implemented in two or more different database structures.

A plurality of buyers 130 including buyers 1-N interface with the transaction finance processor 110. Each buyer provides profile information that is stored in the database 120. In this application, and as may be applicable to various other discussion herein of profiles for buyers, profile information generally includes rules for controlling buyer access to data relating to the transaction (e.g., to view invoices) and for processing transactions involving the buyers. In these contexts, profile information for the buyer or for sellers may include a variety of information, such as by indicating credit data for the buyer or seller, buyer or seller preferences, approved sellers, approved buyers, currency preferences, payment preferences (e.g., timing characteristics), reporting preferences, payment approval preferences, financial institution data or others.

The transaction finance processor 110 also interfaces with a plurality of sellers 140 including sellers 1-N, each seller engaging in a contract with at least one buyer. Accounts payable aspects of the transaction, from each sellers' perspective, is facilitated directly with the transaction finance processor 110. The interfacing between the transaction finance processor 110 and the plurality of sellers includes at least the communication of invoice data from sellers to the transaction finance processor.

For facilitating payment, the transaction finance processor 110 further interfaces with a plurality of financiers 150, including financiers 1-N, for processing financial aspects of transactions involving the buyers 130 and the sellers 140. Certain ones of the financiers 150 associated with the buyers 130 provide funds on behalf of the buyers for merchant offerings (goods and/or services) provided by the sellers 140. For instance, financiers sponsoring a buyer's funding for a transaction underwrite the transaction for the buyers, with payment being tendered to a seller associated with the transaction. Certain ones of the financiers 150 associated with the sellers 140 receive the provided funds on behalf of the sellers (e.g., operate as a bank for the sellers).

The transaction finance processor 110 implements a transaction auditing function 112 and a financial processing function 114 to respectively audit transactions and facilitate payment for (successfully) audited transactions. The financial processing function 114 interacts with the sellers 140 for receiving invoices (e.g., electronically) from the sellers as relating to transactions with the buyers 130. The invoices are processed in different manners, depending upon the implementation. For instance, where the transaction finance processor 110 is implemented for a seller in processing accounts receivable functions, the invoices may be processed for facilitating a payment to the seller in accordance with the seller's profile information (e.g., an advance payment with collection from the buyer being subsequent). Where the transaction processor is implemented for a buyer in processing accounts payable functions, the invoices may be processed for facilitating payment to a seller on behalf of a buyer in accordance with the buyer's profile information (e.g., paying in advance or according to contract terms on behalf of the buyer and collecting from the buyer at a later time).

The transaction auditing function 112 operates in conjunction with the buyers 130 or sellers 140, either directly or using business rules stored in the database 120, for auditing transactions. For instance, with accounts payable functions, where buyer 1 processes transactions by reviewing and approving invoices, the transaction auditing function 112 presents the invoices (or information therein) to buyer 1 for approval. When approval is received, the transaction auditing function 112 passes approval to the financial processing function.

In another example, buyer 1 employs the transaction finance processor 110 for automatic auditing functions, with user profiles (and, e.g., business rules and/or contracts) for buyer 1 setting forth information to be used by the transaction auditing function 112 for auditing invoices. When an invoice for a contract involving buyer 1 meets requirements for payment as indicated by information stored for buyer 1, the transaction auditing function 112 automatically approves the invoice and sends the approval to the financial processing function 114.

Once an invoice is approved for payment, the financial processing function 114 uses profile information for the buyer that is involved in the contract for which the invoice was approved to process payment for the approved invoice. The financial processing function 114 uses funds designated to the buyer, e.g., via a bank account or credit line, for providing payment to the seller sending the approved invoice. Where funds are provided on behalf of a buyer in a credit-type arrangement, the buyer's financier underwrites the payment to the seller. The payment is made to one of the financiers 150 designated by the seller, either in the invoice or with information stored in the database 120.

The financial processing function 114 further assesses fees to the sellers 140, and, in some instances, the buyers 130 for transactions in which each party or parties are involved. Specifically, each of the sellers 140 is assessed a fee relative to the payment processing made in response to an invoice or invoices processed for the seller. This fee may be assessed, for example, using a transaction amount as a basis with a certain portion of the transaction amount being withheld for fees to cover transaction and/or underwriting functions. Various other approaches may also be implemented for assessing fees to the sellers, depending upon the particular application and the sellers' relationship with the transaction finance processor 110. For example, fees may be assessed as a function of two or more transactions, at the end of a cyclic period (with fees assessed for all transactions during that period) or as a flat-fee type basis. The rates by which the fees are set may further be established as a function of one or more of these conditions, as well as subject to an agreement between each of the sellers 140 and the transaction finance processor 110. In other applications, the transaction finance processor 110 assesses certain fees to buyers who are parties to transactions for one or more of a variety of transaction functions, such as credit extension functions, recordkeeping functions and others as discussed herein.

The profile information in the database 120 characterizes, for each buyer, rules and approaches by which the transaction finance processor 110 processes payment for transactions involving the buyer. For example, each buyer typically employs one or more financial institutions for providing payment for transactions as well as payment to an entity operating the transaction finance processor 110 for transaction services. The profile information sets forth, for each buyer, information regarding these financial institutions and further for authorizing the transfer of funds therewith. When the transaction finance processor 110 audits transactions on behalf of buyers (i.e., without direct buyer approval on an invoice-by-invoice basis), the profile information includes information (e.g., business rules) for use in auditing invoices to determine whether the invoice is ready for payment. These approaches may be implemented, for example, as discussed above in connection with the interaction characteristics between the buyers 130 and the transaction finance processor 110.

In some instances, one or more of the sellers 140 also interface with the transaction finance processor 110 for enhanced features, with the transaction finance processor 110 storing and using user profiles for the sellers, stored in the database 120, for granting access to data and further for processing enhanced features. These features may be applicable for implementation with accounts payable and/or accounts receivable functions. For example, when seller 1 wishes to specify particular payment conditions, that seller may contract with the transaction finance processor 110 (i.e., with the transaction finance processor's operator) to carry out the particular payment conditions. These conditions may involve, for example, a payment rule such that the seller is paid early, such as immediately upon submission of an invoice. For this service, the seller is assessed a fee by the transaction finance processor 110 as appropriate and/or designated in a contract with the seller. Other services, such as for tracking payments, modifying payments, extending credit and otherwise are optionally contracted by sellers for processing by the transaction finance processor 110.

In some applications, one or more of the financiers 150 operate independently from the transaction finance processor 110, simply providing or receiving funds as authorized respectively by buyers 130 or sellers 140. In other applications, one or more of the financiers 150 interact with the transaction finance processor 110 directly, with user profiles for the one or more financiers stored in the database 120 and used to control access to information by the financiers and, in some applications, to process interactions with the financiers. In still other applications, one or more of the financiers 150 operate the transaction finance processor 110, or a portion thereof, for processing transactions.

The financiers 150 provide funds on behalf of the buyers 130 using a variety of sources, depending upon the implementation and the agreement between the buyer and the operator of the transaction finance processor. For example, the funds may come directly from an account for the buyer, such as a banking account, or from a credit line associated with the buyer. In some applications involving the use of a credit account, the account used is specified by the buyer and, typically, involves an agreement between the buyer and the specified account's financier. In other applications involving the use of a credit account, the transaction finance processor 110 enlists the services of a financier, on behalf of the buyer, for a particular transaction. Where the transaction finance processor 110 enlists the services of a financier, certain applications involve the grouping of multiple transactions, with one or more buyers, into a larger accounts payable pool with the enlisted financier providing credit to cover the entire accounts payable pool. With such a group approach, the financier underwrites a group of accounts payables, with associated funds accordingly dispersed to different sellers who are involved in transactions associated with the group.

Figure 2:
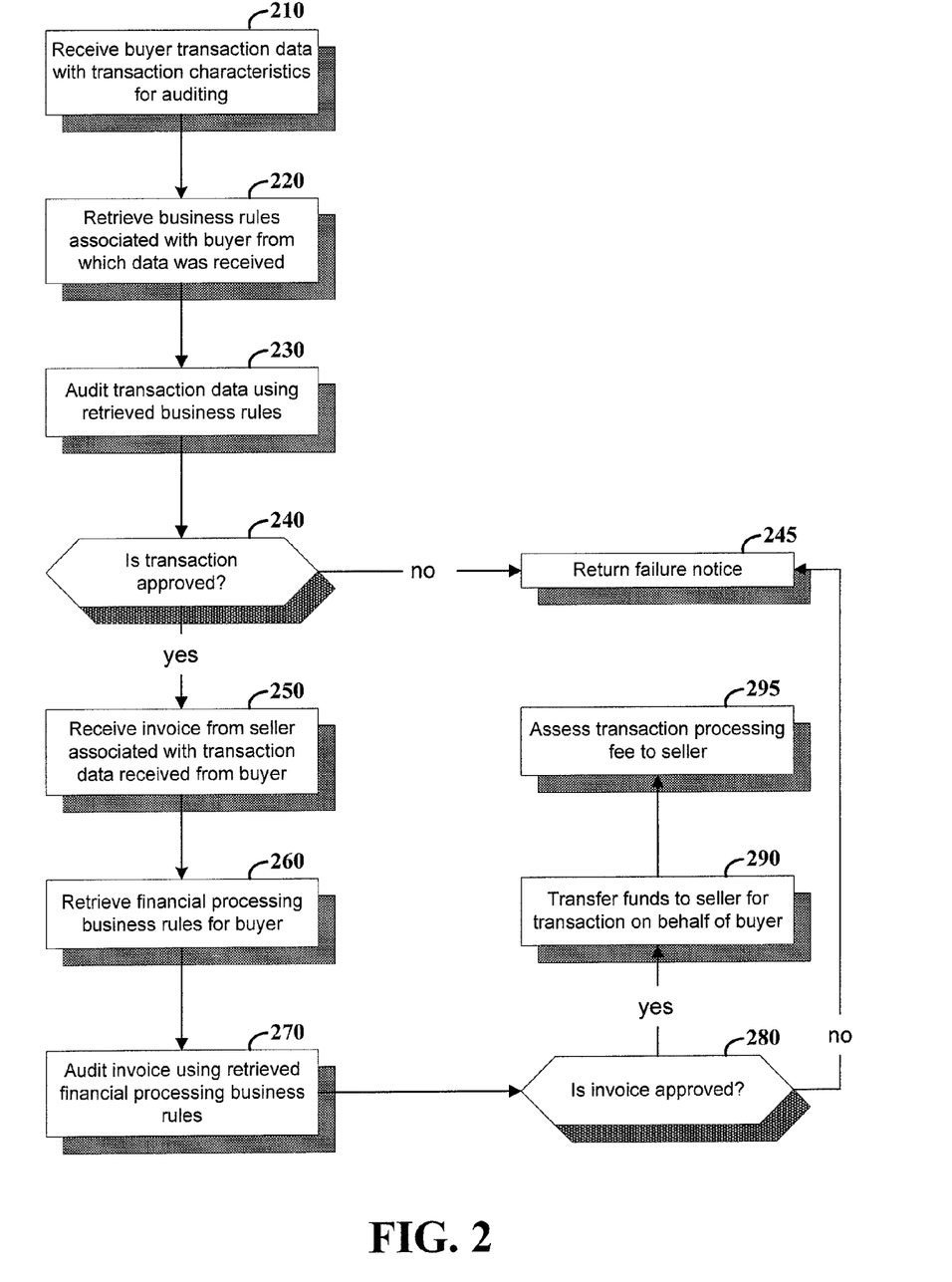
FIG. 2 shows a flow diagram for transaction processing, according to another example embodiment of the present invention.

FIG. 2 shows a flow diagram for accounts payables processing with a dual audit approach for receipt and payment conditions, according to another example embodiment of the present invention. The accounts payables processing approach shown in FIG. 2 can be implemented, for example, using the system and approach 100 shown in FIG. 1.

At block 210, buyer transaction data including auditable characteristics is received for use in processing invoices relating to the transaction data. This transaction data may include, for example, preliminary approval for payment based upon a receipt of goods or upon the performance of a service. Business rules associated with the buyer from which the data was received are retrieved at block 220. At block 230, the transaction data is audited using the retrieved business rules. The business rules may specify, for example, that the auditing should involve the presentment of invoices for approval by the buyer, or that the auditing be automatically performed using characteristics in the business rules for assessing invoices as relative to the received transaction data. In this regard, the transaction data may simply indicate that, for purposes of approval, any invoice is to be submitted directly to the buyer for approval (in this instance, the audit at block 230 may simply be to acknowledge than an invoice can be received).

If the transaction is not approved at block 240, via the audit at block 230, a failure notice is returned to the buyer at block 245 and the transaction processing stops. If the transaction is approved at block 240, the process moves forward to block 250 where an invoice from a seller associated with the transaction data received from the buyer is received. Financial processing business rules for the buyer are retrieved at block 260 and the invoice is audited at block 270, using the retrieved financial processing business rules. Where the business rules specify that the buyer is to directly audit the invoice for approval, the audit at block 270 involves presenting the invoice (or characteristics thereof) to the buyer for approval.

If the invoice is not approved at block 280, via the audit at block 270, a failure notice is returned at block 245 to the buyer (and, in some instances, to the seller providing the invoice). If the invoice is approved at block 280, funds are transferred to the seller at block 290 on behalf of the buyer. This funds transfer may involve, for example, the extension of credit on behalf of the buyer, with underwriting performed by a financier with fees associated with the underwriting being assessed with a transaction fee. A transaction processing fee (including the underwriting fee, where appropriate) is assessed to the seller at block 295. In some instances, the transaction processing fee is assessed to the seller by extracting the fee from any payment processed with the funds transfer at block 290.

Figure 3:
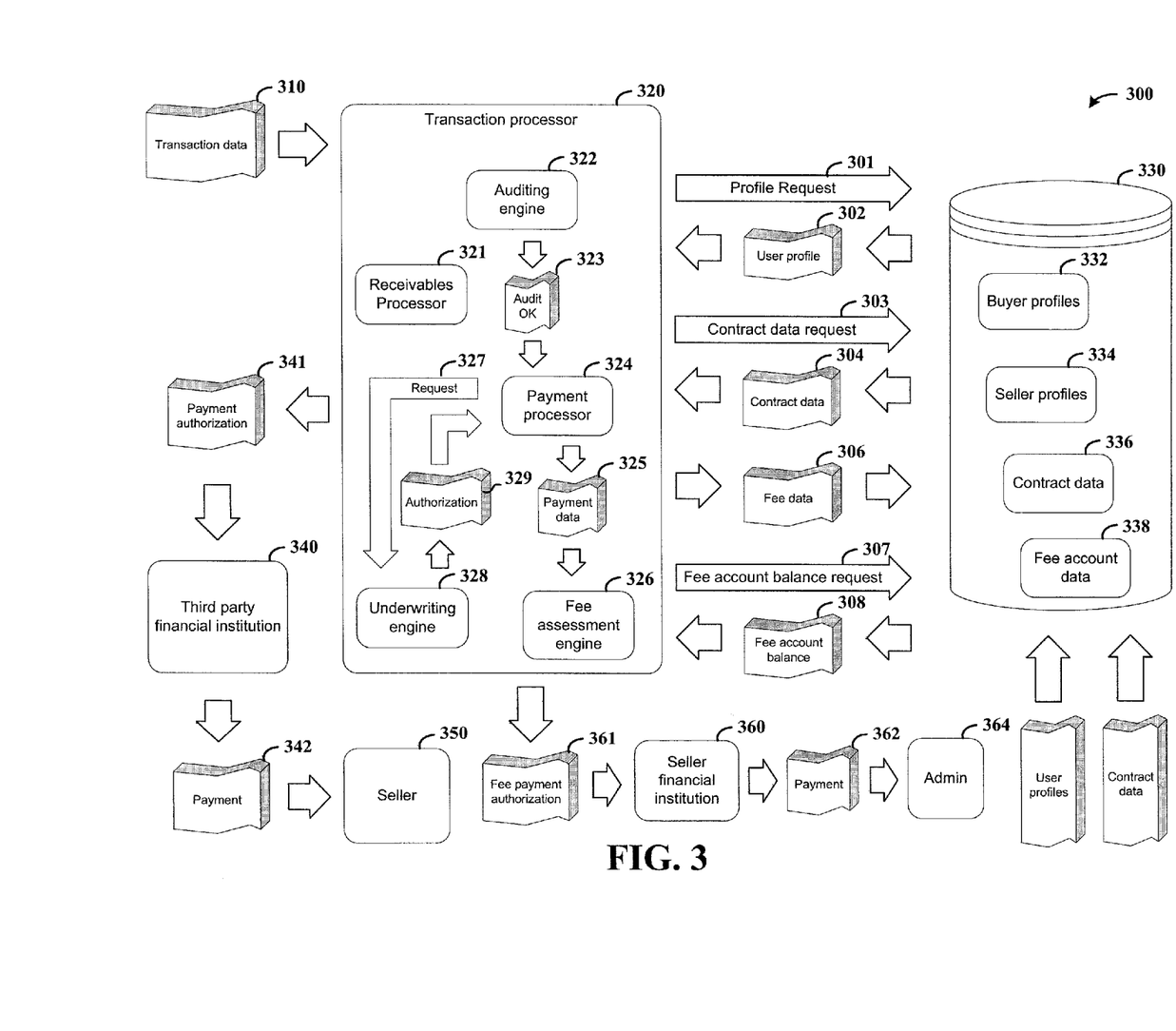
FIG. 3 shows an approach to processing payment on behalf of a buyer or buyers with an underwriting-based extension of credit, according to another example embodiment of the present invention.

FIG. 3 shows an arrangement and approach 300 to processing payment on behalf of a buyer or buyers with an underwriting-based extension of credit and seller-assessed transaction fees, according to another example embodiment of the present invention. A transaction processor 320 uses data in a database arrangement 330 to process payment for transactions involving buyers and sellers, interacting with financial institutions to effect the payment. An administrator 364 of the arrangement and approach 300 collects a fee for processing transactions. While shown as single arrangements, both the transaction processor arrangement 320 and database arrangement 330 are selectively implemented with multiple arrangements in local and/or disparate locations.

When transaction data 310 such as an invoice is received at the transaction processor arrangement 320, a profile request 301 is made to retrieve user profile data 302 from the database arrangement 330. The user profile data 302 includes one or more of buyer profiles 332 and seller profiles 334 for a buyer or seller corresponding to the transaction data 310. The auditing engine 322 also makes a contract data request 303 for a portion of the contract data 336 pertaining to the transaction data 310, and the database arrangement 330 returns contract data 304 in response to the request.

The auditing engine 322 then audits the transaction data (or other portions of the transaction to which the transaction data applies) with the user profile information 302 and the contract data 304. If the audit is successful, positive audit data 323 is sent to a payment processor 324. The payment processor generates a payment authorization 341 that is sent to a third party financial institution 340, which in turn makes a payment 342 to a seller 350 involved in the transaction. In some applications, the third party financial institution 340 is the buyer's financial institution and accordingly collects settlement for the payment from the buyer. In other applications, the third party financial institution 340 is associated with the transaction processor arrangement 320 (and the administrator 364), such that the transaction processor arrangement and/or the third party financial institution subsequently settles with the buyer for the payment 342 made on behalf thereof.

When payment is authorized, the payment processor also sends payment data 325 to a fee assessment engine 326, the payment data indicating that the payment has been authorized. In some applications, the fee assessment engine 326 responds to the payment data 325 by sending fee data 306 to the database arrangement 330 for storage with fee account data 338 for the seller 350. When payment for assessed fees is to be made, the fee assessment engine 326 makes a fee account balance request 307 of the database arrangement 330, which returns fee account balance data 308 to the fee assessment engine. Using the fee account balance data 308, the fee assessment engine generates a fee payment authorization 361 for a particular seller and sends that authorization to the seller's financial institution 360, which generates and sends a payment 362 for the assessed fees to the administrator 362.

In other applications, fees are assessed to each payment as the payment is authorized. The fee assessment engine returns the fee data 306 directly to the payment processor 324, prior to the payment authorization 341 being made. The payment processor responds by reducing the amount of payment in the payment authorization 341 by the amount of fee specified in the fee data. In this regard, the seller is paid what it is owed for a particular transaction, less a transaction fee, with the transaction processor collecting funds in the amount of the fee from the buyer upon settlement.

In some embodiments, a receivables processor 321 interacts with the payment processor 324 (or operates on a common computer system) to facilitate payment to sellers in accordance with transaction data and profile information for the seller. For instance, where sellers specify, via profiles, a manner in which payment is to occur (e.g., timing for advanced payment, account to be credited), the receivables processor 321 communicates appropriate information to the payment processor 324. The receivables processor 321 tracks each payment against accounts receivable information for the seller to which the payment is made. This tracking may involve, for example, monitoring accounts receivable files and updating those files when payment is made to ensure that the seller is appropriately paid for goods and or services that the seller provides. Where appropriate, the receivables processor 321 also communicates accounts payable status to the seller 350, and further may interact to facilitate the payment authorization 341 and payment 342.

In certain applications, the transaction processor arrangement 320 also includes an underwriting engine 328 that facilitates the underwriting of the extension of credit to buyers involved in transactions characterized by the transaction data 310. When credit is to be extended on behalf of a buyer (e.g., as specified in the user profile 302 returned from the database arrangement 330), the payment processor 324 sends an underwriting request 327 to the underwriting engine 328. The underwriting request includes information characterizing the buyer for which credit underwriting is requested, together with an amount of the payment to be authorized and any other information needed to facilitate the underwriting of the payment.

The underwriting engine 328 uses the information in the request 327 and, where appropriate, accesses external information (such as credit reports) and returns underwriting authorization data 329 to the payment processor 324. The payment processor 324 uses the underwriting authorization data 329 to make the payment authorization 341. In some applications, the underwriting authorization data 329 specifies a particular interest rate or other financing fee, assessed via the fee assessment engine 326.

In another implementation involving the underwriting engine 328, the payment processor 324 uses information in the user profile data 302 to determine whether an interest rate or other fee proposed via the underwriting authorization 329 is acceptable to the buyer and/or seller. For example, where a particular buyer is willing to draw against a credit line at credit terms up to a particular limit, the payment processor 324 authorizes payment when the underwriting authorization 329 specifies terms within that particular limit for the buyer.

In still other applications, the administrator 364 obtains credit for making the payment authorization 341 for a multitude of sellers. With this approach, the underwriting engine 328 generates an underwriting authorization 329 as a function of underwriting conditions set by the administrator 364. That is, the administrator 364 agrees (via contract with a particular buyer or otherwise) to carry underwriting responsibility for credit extended on behalf of a buyer, when the buyer meets certain underwriting criteria. In this regard, the administrator 364's credit score is used to obtain credit (e.g., from the third party financial institution 340) when generating the underwriting authorization 329 and subsequent payment 342. When the underwriting engine 328 returns underwriting authorization data 329 that meets criteria set by the administrator 364, the payment processor 324 makes the payment authorization 341. In many applications, this approach results in favorable credit terms for a particular buyer, which may be used by the administrator 364 to encourage buyers to use the transaction processor arrangement 320, with the administrator in turn earning money via fees assessed to sellers and, in some applications, via the credit terms.

In certain specific embodiments, the approaches as shown in and described herein (e.g., in connection with FIG. 3) are implemented with a freight-type of transaction as described in U.S. Pat. No. 5,910,896 to Hahn-Carlson. Other specific embodiments are directed to the implementation of transaction processing approaches for collaboration and/or other aspects of contract-based transactions as described in U.S. patent application Ser. Nos. 10/436,878 ("Automated Transaction Processing System and Approach"); and issued as U.S. Pat. No. 7,496,519; 10/864,761 ("Automated Transaction Processing System and Approach"); and 11/149,977 ("Distributor-based Transaction Processing Arrangement and Approach"), all to Hahn-Carlson. All of these patent documents are fully incorporated herein by reference. For example, relative to U.S. patent application Ser. No. 10,864,761, incoming invoices (e.g., such as approved invoices received from a buyer) may be matched using an anchor approach as described therein. As another example, relative to U.S. patent application Ser. No. 10,436,878, a collaborative-based approach is implemented as applicable to a relationship between a buyer and seller for processing in a manner not inconsistent with the discussion herein, such as with FIG. 3.

While certain aspects of the present invention have been described with reference to several particular example embodiments, those skilled in the art will recognize that many changes may be made thereto without departing from the spirit and scope of the present invention, aspects of which are set forth in the following claims.

What is claimed is:

1. An automated transaction processing system for electronically processing transactions involving buyers and sellers, the system comprising:
    a correlation database that stores
        contract data sets, each set being defined pursuant to a stored agreement between the buyer and seller involved in the transaction to which the contract data set applies,
        profile data for each transaction including payment terms defined by at least one of a buyer and seller in each transaction, the payment terms including information that, when used with transaction data in an algorithm executed by a computer processor, generates payment approval data, and
        underwriting data stored for each of a multitude of disparate financier parties that finance transactions by extending credit for providing payment for the transactions,
    a transaction processor arrangement programmed to process electronic transactions according to the stored contract data sets and profile data, each transaction being characterized by a transaction data set received from a transaction participant, the transaction processor arrangement comprising
        a correlation engine configured to correlate each received set of transaction data with a contract data set, with profile data for the transaction and with underwriting data for a financier that will underwrite payment for the transaction,
        a computer-implemented auditing engine programmed, for each transaction involving a buyer and at least one seller, to execute an algorithm for auditing a transaction data set for the transaction using the correlated contract data set and profile data for the transaction as inputs to the algorithm to determine a condition of payment authorization for the transaction, and to generate computer-readable audit data characterizing the audit,
        a computer-implemented underwriting engine programmed, for each transaction data set for which payment is authorized, to execute an algorithm using the correlated underwriting data as an input to authorize the extension of credit to fund the payment,
        a computer-implemented payment processor programmed, for each transaction data set, to process electronic payment to each seller financial institution pertaining to the transaction data set in response to generated audit data indicating that payment to the seller is appropriate for at least one transaction involving the seller and a buyer, using an extension of credit authorized via the underwriting engine, and
        a computer-implemented fee assessment engine programmed to assess a transaction processing fee, for each seller to which electronic payment is made, by generating computer-readable fee data that associates the fee and a fee amount with a seller for which the fee data is generated.

2. The system of claim 1, wherein
    the auditing engine audits transaction data including electronic invoice data by authenticating the electronic invoice data in response to an electronic data communication from the buyer indicating that an amount in the invoice is payable, and generating computer-readable audit data indicating the authentication, and
    the payment processor finances and processes payment to a seller financial institution for a seller specified in the invoice data in response to the generated computer-readable audit data indicating the authentication.

3. The system of claim 1, wherein the auditing engine audits the transaction data using stored computer-readable profile data for the at least one seller, the profile data indicating information that can be processed by the auditing engine to generate the computer-readable audit data.

4. The system of claim 1, wherein the payment processor reflects the payment to the seller in a credit account for the buyer.

5. The system of claim 4, wherein the fee assessment engine assesses a fee against a seller receiving electronic credit-based payment in response to the generated approval data by generating computer-readable fee data that associates the fee and the fee amount with the seller.

6. The system of claim 1, wherein
    the computer-implemented underwriting engine is configured to
        underwrite the extension of credit to buyers for electronic payment made to a seller's financial institution using credit data in profile information for the buyers specifying a sponsoring financier underwriting payments made on behalf of the buyers, and
        generate computer-readable approval data for extending credit to a buyer to fund the payment for each underwritten transaction,
    the payment processor is programmed to process electronic credit-based payment to a seller financial institution in response to the generated audit data and the generated approval data, and reflects the payment to the seller in a credit account for the buyer, and
    the fee assessment engine assesses a fee to the seller on behalf of a sponsoring financier underwriting the payment by generating computer-readable fee data that associates the fee and a fee amount with the seller for which the fee data is generated.

7. The system of claim 1, wherein
    the computer-implemented underwriting engine is programmed to
        underwrite the extension of credit to sellers for electronic payment made to the seller's financial institution using credit data in profile information for the buyers, and
        generate computer-readable approval data for extending credit to a seller for each underwritten transaction,
    the payment processor is programmed to process electronic credit-based payment to a seller financial institution in response to the generated audit data and the generated approval data, and reflects the payment to the seller in a credit account for the seller, and
    the fee assessment engine assesses a fee to the seller for the underwriting by generating computer-readable fee data that associates the fee and a fee amount with the seller for which the fee data is generated.

8. The system of claim 1, wherein the auditing engine audits the transaction data by comparing the transaction data to stored contract data to determine whether payment is appropriate.

9. The system of claim 1, wherein the fee assessment engine assesses a transaction processing fee by generating transaction processing fee data in accordance with computer-readable contract data for a contract between a seller receiving payment and an operator of the transaction processor arrangement.

10. The system of claim 1, wherein the payment processor finances and processes payment by providing an electronic payment to the seller financial institution for an amount owed by the buyer to the seller, less a transaction processing fee assessed against the seller by the fee assessment engine.

11. The system of claim 1, wherein
the auditing engine audits transaction data including seller invoice data by processing the invoice data using stored contract data for the transaction, and
the payment processor finances and processes electronic payment to a seller financial institution for a seller specified in the invoice data in response to the audit data indicating that payment is appropriate for the seller invoice data.

12. The system of claim 10, wherein the auditing engine audits transaction data including seller invoice data for an invoice that is pre-approved for payment by a buyer to which the invoice applies by generating computer-readable audit data, for the payment processor, indicating that payment is pre-approved.

13. The system of claim 1, wherein the payment processor facilitate electronic settlement to collect funds from a buyer to cover payments made to sellers on behalf of the buyer.

14. The system of claim 1, wherein the payment processor
electronically acquires data specifying a right to collect funds from buyers for transactions for which the payment processor finances and processes electronic payment to sellers, and
facilitates electronic settlement to collect funds from buyers to cover payments made to sellers on behalf of the buyers.

15. The system of claim 1, wherein the fee assessment engine generates the computer-readable fee data by generating data that includes information for providing at least a portion of the assessed fee to a buyer involved in the transaction for which the fee is assessed.

16. The system of claim 1, further including a computer-implemented receivables processor to
interact with the payment processor to facilitate payment to sellers in accordance with transaction data and profile information for the seller, and
track each payment against accounts receivable information for the seller to which the payment is made.

17. A method for electronically processing transactions involving buyers and sellers using, for each transaction, electronic profile data that is appropriate to each buyer/seller pairing and a contract data set defined as a function of the buyer and a predefined business relationship between the buyer and at least one seller, the method comprising:
programming a computer processor with software to process electronic transactions according to the stored contract data sets and profile data, by
for each transaction involving a buyer and at least one seller, auditing transaction data using a stored contract data set and profile data for the transaction to determine a condition of payment for the transaction, and generating computer-readable audit data characterizing the audit, the contract data set being defined pursuant to an agreement between the buyer and seller involved in the transaction, the profile data including data defining payment terms for the buyer/seller pairing in the transaction,
financing and processing electronic payment to a seller financial institution by generating and outputting electronic payment data in response to generated audit data indicating that payment to the seller is appropriate for at least one transaction involving the seller and a buyer, and
assessing a transaction processing fee, for each seller to which electronic payment is made, by generating computer-readable fee data that associates the fee and a fee amount with a seller for which the fee data is generated.

18. The method of claim 17, wherein
the step of auditing includes auditing electronic invoice data by authenticating the electronic invoice data in response to an electronic data communication from the buyer indicating that an amount in the invoice is payable, and generating computer-readable audit data indicating the authentication, and
the step of financing and processing electronic payment includes generating an electronic payment to a seller financial institution for a seller specified in the invoice data in response to the generated computer-readable audit data indicating the authentication.

19. The method of claim 17,
further including underwriting the extension of credit to buyers using credit data in profile information for the buyers and generating computer-readable approval data for extending credit to a buyer for each underwritten transaction, and
wherein the step of financing and processing electronic payment includes financing and processing electronic credit-based payment to a seller financial institution in response to the generated audit data and the generated approval data for extending credit to a buyer, and reflecting the payment to the seller in a credit account for the buyer.

20. The method of claim 17,
further including underwriting the extension of credit to buyers for electronic payments made to seller financial institutions using credit data in profile information for the buyers that specifies a sponsoring financier for underwriting payments made on behalf of the buyers, and generating computer-readable approval data for extending credit to each buyer for which a transaction is underwritten,
wherein the step of financing and processing electronic payment includes financing and processing electronic credit-based payment to a seller financial institution in response to the generated audit data and the generated approval data, and reflecting the payment to the seller in a credit account for the buyer, and
wherein the step of assessing a transaction processing fee includes assessing a fee to the seller on behalf of a sponsoring financier underwriting the payment by generating computer-readable fee data that associates the fee and a fee amount with the seller for which the fee data is generated.

21. The method of claim 17,
further including underwriting the extension of credit to sellers for electronic payment made to the sellers' financial institutions using credit data in profile information for buyers on behalf of which the payment is based, and generating computer-readable approval data for extending credit to each seller for each underwritten transaction for the seller, wherein the step of financing and processing electronic payment includes financing and processing electronic credit-based payment to a seller financial institution in response to the generated audit data and the generated approval data, and reflecting the payment to the seller in a credit account for the seller, and wherein the step of assessing a transaction processing fee includes assessing a fee to the seller for the underwriting by generating computer-readable fee data that associates the fee and a fee amount with the seller for which the fee data is generated.

22. A transaction-based computer processor for processing payable funds for transactions between buyers and sellers, wherein at least one of a buyer and seller in each transaction transacts with a system administrator to process a payment account for the at least one of a buyer and seller, the computer processor being independent from the buyers and sellers and configured with software to:

for each of a plurality of seller invoice data sets,
associate the seller invoice data set with a transaction involving a buyer and seller using predefined contract data for a contract between the buyer and the seller,
audit the associated invoice data set using the predefined contract data and audit data specified by the buyer in the transaction to determine a condition of payment for the transaction, and
generate computer-readable audit data characterizing the audit;

for each buyer, process electronic payment to sellers' financial institutions in response to generated audit data indicating that payment to a seller is appropriate for at least one invoice data set for the seller; and assess a transaction processing fee for each processed electronic payment by generating computer-readable fee data that associates the assessed fee and fee amount with a seller for which the electronic payment is generated.

23. The processor of claim 22, wherein the transaction processing fee is assessed in an amount that is a percentage of the processed electronic payment.

24. The processor of claim 22, wherein the transaction processing fee includes a fee assessed against the buyer and the seller for each payment.

25. The processor of claim 22, wherein the electronic payment is processed in accordance with contract data between an operator of the processor arrangement and at least one of the buyer and seller involved the each transaction for which payment is processed.

26. The system of claim 1, wherein
the computer-implemented auditing engine is programmed to audit each transaction data set using the contract data and profile data as inputs to determine that at least a portion of a transaction has reached payable status, and
the computer-implemented payment processor is programmed, for each buyer, to finance and process a single electronic payment to each seller's financial institution to which the buyer owes funds to cover all transactions involving the seller and having been determined to reach payable status during a predefined period.

27. The method of claim 17, wherein
auditing includes auditing each transaction-data set using the contract data and profile data as inputs to determine that at least a portion of a transaction has reached payable status, and
financing and processing electronic payment includes, for each buyer, generating a single electronic payment instruction to each seller's financial institution to which the buyer owes funds to cover all transactions involving the seller and having been determined to reach payable status during a predefined period.

28. The processor of claim 22, wherein the computer processor is configured with software to
audit the invoice data by auditing each invoice data set using the contract data as an input to determine that at least a portion of a transaction has reached payable status, and
process electronic payment, for each buyer, by generating a single electronic payment instruction to each seller's financial institution to which the buyer owes funds to cover all transactions involving the seller and having been determined to reach payable status during a predefined period.

* * * * *